US012801626B2

(12) United States Patent
Haimov et al.

(10) Patent No.: US 12,801,626 B2
(45) Date of Patent: Nov. 17, 2026

(54) DATA SYNCHRONIZATION BETWEEN ENDPOINT DEVICES IN AN EDGE NETWORK

(71) Applicant: Dell Products L.P., Round Rock, TX (US)

(72) Inventors: Nisan Haimov, Beer Sheva (IL); Boris Shpilyuck, Ashdod (IL); Igor Dubrovsky, Beer Sheva (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 96 days.

(21) Appl. No.: 18/756,254

(22) Filed: Jun. 27, 2024

(65) Prior Publication Data

US 2026/0003886 A1 Jan. 1, 2026

(51) Int. Cl.
*G06F 16/27* (2019.01)

(52) U.S. Cl.
CPC .................................... *G06F 16/27* (2019.01)

(58) Field of Classification Search
CPC .... G06F 16/23; G06F 21/602; G06F 16/2379; G06F 16/2365; G06F 21/64; G06F 16/27; H04L 67/1097; H04L 67/1095; H04L 9/50; G06Q 40/04
See application file for complete search history.

(56) References Cited

U.S. PATENT DOCUMENTS 9,244,761 B2 * 1/2016 Yekhanin ............ H03M 13/373
9,639,433 B2 * 5/2017 Rabinovich ......... G06F 11/1453
9,959,062 B1 * 5/2018 Piszczek ............. G06F 11/1662
10,133,503 B1 * 11/2018 Colgrove .............. G06F 3/0665
10,275,506 B1 * 4/2019 Schneider ............... G06F 16/27
10,503,640 B2 * 12/2019 Eckert ................. G06F 12/0817
10,812,482 B1 * 10/2020 Xu ......................... G06F 21/604
11,650,967 B2 * 5/2023 Coburn ............... G06F 16/2246 707/802
11,916,764 B1 * 2/2024 Nagaraju ............ G06F 16/2477
12,061,592 B1 * 8/2024 Bensberg ............ G06F 16/2322
12,388,812 B2 * 8/2025 Balin ..................... H04L 63/083
2006/0277180 A1 * 12/2006 Okamoto .............. G06F 16/256
2010/0306180 A1 * 12/2010 Johnson ................ G06F 16/125 707/E17.007

(Continued)

OTHER PUBLICATIONS

Frank Dabek, Jinyang Li, Emil Sit; James Robertson, M. Frans Kaashoek, Robert Morris, "Designing a DHT for Low Latency and High Throughput" NSDI (2004), pp. 85-98 (Year: 2004).*

*Primary Examiner* — Ninos Donabed
(74) *Attorney, Agent, or Firm* — WOMBLE BOND DICKINSON (US) LLP

(57) ABSTRACT

Methods and systems for data synchronization between endpoint devices in an edge network are disclosed. The method may include distributing data generated by an endpoint device to any number of additional endpoint devices based on a replication policy, and maintaining a distributed storage system (e.g., a distributed hash table) for data hosted by the endpoint devices. When a data access event for a portion of the data hosted by the endpoint devices occurs, one endpoint device may be selected, based on the distributed hash table and/or latency considerations, from which at least a copy of the portion of the data may be retrieved and used in providing computer-implemented services.

20 Claims, 7 Drawing Sheets

(56) References Cited

U.S. PATENT DOCUMENTS

2011/0191389 A1* 8/2011 Okamoto ................ G06F 16/00
707/E17.005
2012/0291134 A1* 11/2012 Masuda .................. G06F 21/10
726/26
2014/0268245 A1* 9/2014 Kawach ............. H04N 1/00244
358/403
2014/0280023 A1* 9/2014 Jagtap ............... G06F 16/24544
707/714
2014/0358938 A1* 12/2014 Billmaier .............. G06F 16/137
707/747
2014/0359043 A1* 12/2014 Gao ...................... G06F 15/167
709/212
2016/0337478 A1* 11/2016 Osterloh ................. H04L 12/18
2017/0012844 A1* 1/2017 Ellison .................. H04L 69/162
2017/0154042 A1* 6/2017 Meyer ................. G06F 16/2255
2018/0099249 A1* 4/2018 Kronewitter ....... G01N 30/8696
2018/0285427 A1* 10/2018 Kaplan ................. G06F 16/285
2018/0285441 A1* 10/2018 Kaplan ................. G06F 16/137
2019/0026303 A1* 1/2019 Guerra Delgado ..........................
G06F 16/1748
2019/0068466 A1* 2/2019 Chagam Reddy ... B25J 15/0014
2019/0095106 A1* 3/2019 Li ......................... G06F 3/0653
2019/0158593 A1* 5/2019 Sloane .................. H04L 63/083
2019/0205317 A1* 7/2019 Tobias .................... G06F 16/00
2019/0229905 A1* 7/2019 Fan ..................... H04L 63/0428
2020/0293964 A1* 9/2020 Billeter .............. G06Q 10/0635
2020/0366700 A1* 11/2020 Prokop ................... G06F 21/32
2020/0387482 A1* 12/2020 Blair ................... G06F 16/1873
2021/0357373 A1* 11/2021 Vemulapalli ........ G06F 16/2453
2021/0385243 A1* 12/2021 Ali-Ahmad ......... H04L 63/0281
2022/0070006 A1* 3/2022 Jetzfellner .............. G06F 21/64
2022/0286360 A1* 9/2022 Gali .................... H04L 12/2876
2022/0395748 A1* 12/2022 Salvi ..................... A63F 13/352
2024/0419583 A1* 12/2024 Xiang ................... G06F 3/0641
2025/0097253 A1* 3/2025 Huang ................ H04L 63/1433
2025/0363304 A1* 11/2025 Fortkort ................ G06F 40/284

* cited by examiner

DATA SYNCHRONIZATION BETWEEN ENDPOINT DEVICES IN AN EDGE NETWORK

FIELD

Embodiments disclosed herein relate generally to managing data synchronization between endpoint devices in an edge environment. More particularly, embodiments disclosed herein relate to managing data synchronization between endpoint devices in an edge environment by sharing data between any number of endpoint devices while considering latency.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
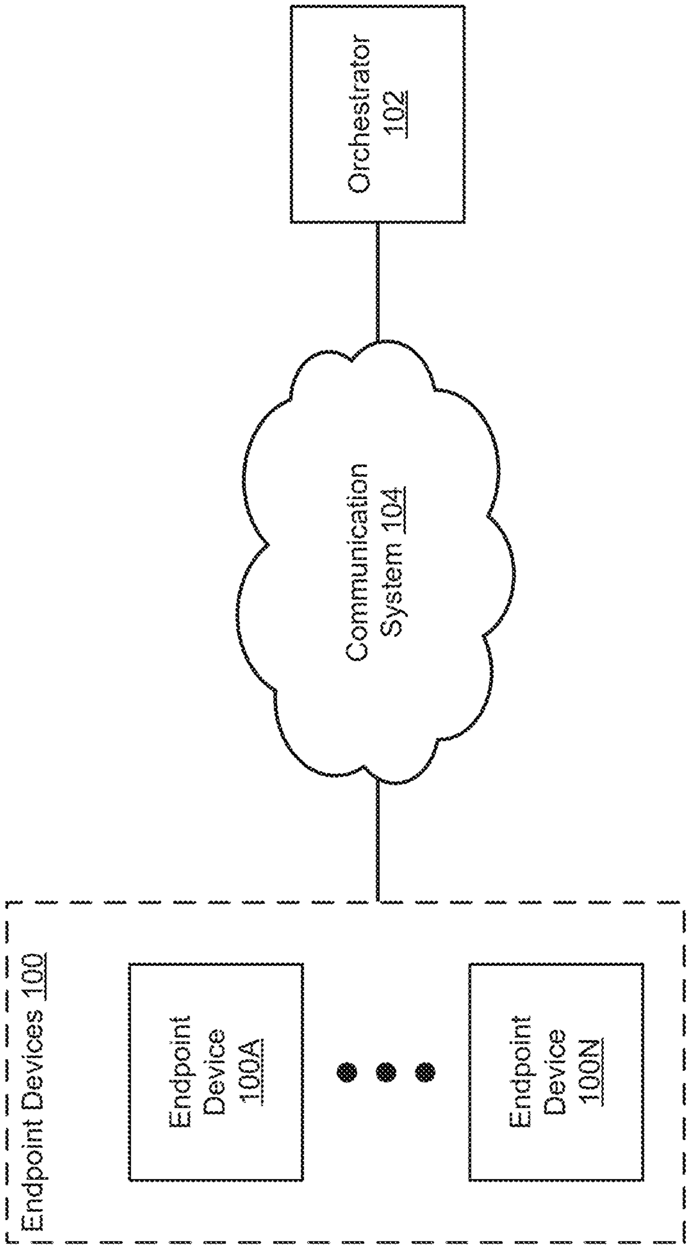
FIG. 1A shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to “one embodiment” or “an embodiment” means that a particular feature, structure, or characteristic described in conjunction with the embodiment can be included in at least one embodiment. The appearances of the phrases “in one embodiment” and “an embodiment” in various places in the specification do not necessarily all refer to the same embodiment.

References to an “operable connection” or “operably connected” means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data synchronization between endpoint devices in an edge environment. The endpoint devices may each generate data, and the data may be provided to any number and type of other endpoint devices for use in providing various computer-implemented services.

The endpoint devices (e.g., edge devices) may operate in an edge environment. For example, any number and type of endpoint devices may be deployed to different physical locations for generating data (e.g., real-time data) relevant to experiences of the endpoint devices at the corresponding physical locations.

An orchestrator may manage deployment of the endpoint devices and facilitate communication of the data. For example, when an endpoint device generates data, the data may be propagated to the orchestrator where the data may be stored and provided to other endpoint devices when the other endpoint devices request the data. The orchestrator and the endpoint devices may be connected by a physical network (e.g., a local area network).

However, a quality of the computer-implemented services provided by the endpoint devices may be reduced due to delays in data communication. For example, data obtained by an endpoint device from the orchestrator based on a request from the endpoint device may be delayed due to latency in the transmission of the request and/or data, network congestion, service unavailability of the orchestrator, and/or any other constraints.

To improve an availability and/or timeliness of computer-implemented services provided by endpoint devices in an edge environment, data may be synchronized between the endpoint devices without traversing an orchestrator. To do so, the endpoint devices may be hosted in any number of overlay networks to enable direct communication between the endpoint devices.

When data is generated by an endpoint device, the data may be replicated so that any number of replicated copies of the data may hosted by additional endpoint devices. To do so, information regarding the data (e.g., content of the data, a data source, etc.) may be provided to a distributed data storage (e.g., distributed hash map) and data hosts (e.g., the additional endpoint devices) may be identified to each host a replicated copy of the data. The data hosts may be identified based on qualities of the endpoint devices (e.g., location in an availability zone, latency, etc.).

When a request for data is obtained by an endpoint device, a data host may be identified from which the data may be retrieved. To do so, a lookup may be performed on the distributed hash map to obtain any number of identities of data hosts that may host replicated copies of the data. A data host may be selected to retrieve the data from based at least in part on latency (e.g., time to transmit the request and receive a response) between the endpoint device and the data host.

Thus, embodiments disclosed herein may provide an improved method for managing data synchronization between endpoint devices in an edge environment by hosting replicated copies of data in a distributed hash map and retrieving requested data directly from a data host based at least in part on latency to retrieve the requested data from the data host. By doing so, the data may be provided to an endpoint device for use in providing computer-implemented services in a timely manner.

In an embodiment, a method for managing data synchronization between endpoint devices in an edge network is provided. The method may include: (i) identifying an occurrence of a data access event for a portion of data hosted by the endpoint devices; (ii) based on the occurrence: (a) identifying a portion of the endpoint devices that store copies of the portion of the data using a distributed hash map; (b) obtaining a latency for each endpoint device of the portion of the endpoint devices, the latency indicating a time required for the portion of the data to be retrieved from the respective endpoint device; (c) selecting, based on the latency associated with each endpoint device of the portion of the endpoint devices, one endpoint device of the portion of the endpoint devices; (d) obtaining the portion of the data from the selected one endpoint device; and (e) providing computer-implemented services using the portion of the data.

The method may further include: prior to identifying the occurrence of the data access event: (i) generating, by a second endpoint device of the endpoint devices, the portion of the data; (ii) storing, by the second endpoint device, the copies of the portion of the data based on a replication policy; and (iii) updating the distributed hash map based on the copies of the portion of the data.

Updating the distributed hash map may include: (i) assigning a key for the portion of the data, the key being based, at least in part, on a hash function; and (ii) storing, using the key, information regarding the portion of the data in the distributed hash map.

The replication policy may define a set of rules for storing the copies of the portion of the data so that an average latency for accessing a copy of the copies of the portion of the data meets criteria.

The set of rules for storing the copies of the portion of the data may indicate: (i) fault domain requirements for replicated copies of stored data; and (ii) latency requirements for accessing the replicated copies of stored data.

The endpoint devices may be members of an overlay network, the overlay network being managed using a set of firewall rules enforced by the endpoint devices.

Obtaining the portion of the data from the selected one endpoint device may include communicating with the selected one endpoint device while adhering to the set of firewall rules, the firewall rules including a first rule set for non-overlay network communications, and a second ruleset for overlay network communication, the second rule set including a whitelist for members of the overlay network.

Identifying the portion of the endpoint devices that may store copies of the portion of the data using the distributed hash map may include: (i) performing a lookup in the distributed hash map using a hashed representation of a query as a key to obtain a lookup result that may indicate identities of the portion of endpoint devices that stores the copies of the portion of the data.

The query may include: (i) an identity of an endpoint device that generated the portion of the data; (ii) a metric of the portion of the data; and (iii) a date and/or time that the portion of the data was generated.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1A, a system in accordance with an embodiment is shown. The system may provide any number and types of computer-implemented services (e.g., to user of the system and/or devices operably connected to the system). The computer-implemented services may include, for example, data storage service, instant messaging services, etc.

To provide the computer-implemented services, the system may include endpoint devices 100, and orchestrator 102. The computer-implemented services may be provided by one or more components of the system of FIG. 1A. For example, an endpoint device (e.g., 100A) of endpoint devices 100 may provide at least a portion of the computer-implemented services using data obtained from a second endpoint device (e.g., 100B) of endpoint devices 100.

Endpoint devices 100 may be deployed in an edge environment. The edge environment may include a deployment of any number or type of endpoint devices (e.g., data processing systems). Each of the endpoint devices may operate at a different physical location to generate data relevant to experiences of an endpoint device at the corresponding physical location.

Because an endpoint device of endpoint devices 100 may include limited computing resources (e.g., security protocols, communication limitations, etc.), orchestrator 102 may manage deployment of endpoint devices 100. Endpoint devices 100 and orchestrator 102 may be connected via a physical network (e.g., a local area network). Furthermore, orchestrator 102 may facilitate communication of data. For example, when an endpoint device of endpoint devices 100 generates data, the data may be propagated to orchestrator 102 where the data may be centrally stored and provided to other endpoint devices when the other endpoint devices request the data. The other endpoint devices may provide computer-implemented services using the data (e.g., make decisions based on the data).

However, the computer-implemented services may be negatively impacted due to a delay in communication of the data. For example, communication of the data may be delayed due to latency in the transmission of the request and/or data, network congestion, service unavailability of orchestrator 102, limitations in communication protocols, and/or any other constraints.

In general, embodiments disclosed herein may provide methods, systems, and/or devices for managing data synchronization between endpoint devices in an edge environment.

To manage data synchronization between endpoint devices, data may be shared directly between the endpoint devices while operating in an overlay network. When the data is generated, any number of replicated copies of the data may be stored on additional endpoint devices and storage of the replicated copies of the data may be managed by a distributed data storage system (e.g., a distributed hash map).

The overlay network may be established, for example, by configuring an overlay network (e.g., a virtual network, a logical network, etc.) that may be supported by the physical network over which the endpoint devices may be connected. The overlay network may be managed using security protocols (e.g., a set of firewall rules) that may provide network traffic controls for entities with which endpoint devices may and/or may not be allowed to communicate (e.g., a whitelist). For example, consider a scenario in which the physical network is segmented into a plurality of network segments (e.g., logical networks). The configured overlay network may define a set of firewall rules for the plurality of network segments such that members (e.g., a group of endpoint devices) of a first network segment of the plurality of network segments may be allowed to communicate with other members of the first network segment but not with members of a second network segment. To facilitate communication between members of different network segments, tunnel endpoints (e.g., network devices, routers, switches, etc.) may be employed in the respective network segments. By doing so, replicated copies of data may be distributed to and/or accessed from any endpoint device by any other endpoint device hosted in the overlay network while maintaining data security (e.g., by adhering to the set of firewall rules).

To manage storage and subsequent retrieval of the replicated copies of the data, a distributed storage system (e.g., a distributed hash map) may be used. The distributed hash map may include information relevant to the stored copies of the data, for example, (i) a key for the data, (ii) a value of the data, (iii) a source of the data, (iv) hosts of the replicated copies of the data, and/or any other information. When newly generated data is added to the distributed hash map, the newly generated data may be assigned a key. The key may be assigned, for example, by applying a hash function to a string value of data identification information (e.g., a combination of an endpoint device identifier, data metric, date, time, etc.).

When data is first generated by an endpoint device, the data may be replicated and any number of replicated copies of the data may be stored on additional endpoint devices. The replicated copies of the data may be stored on the additional endpoint devices according to a replication policy. The replication policy may define a set of rules for storing the replicated copies of the data so that an average latency for accessing a copy of a portion of the data meets criteria. The criteria may include, for example, being within a certain time threshold (e.g., 100 milliseconds). The distributed hash table may be updated with information regarding the additional endpoint devices that store the replicated copies of data so that any endpoint device may utilize the distributed hash table when attempting to access data.

To improve a likelihood that the average latency meets the criteria when the data is accessed, the replication policy may, for example, indicate different fault domains (e.g., utilizing different power sources so that if endpoint devices in a first fault domain are unavailable due to a power outage, then endpoint devices in a second fault domain may be available) to distribute replicated copies of the data, latency requirements for accessing the replicated copies of the data, and/or apply any other rules.

When a data access event for a portion of data hosted by the endpoint devices occurs, the distributed hash map may be used to identify the portion of the endpoint devices that store copies of the portion of the data. To do so, an endpoint device requesting access to the portion of the data may perform a lookup in the distributed hash map using a hashed representation of a query as a key to option a lookup result that indicates identities of the portion of the endpoint devices that store the copies of the portion of the data. For example, the query may include identifying information for the data such as a data source, a date/time, a data metric, a range of dates/times, and/or any other information. Because a plurality of endpoint devices may store copies of the portion of the data, latency may be considered to select an endpoint device from which to retrieve the copy of the portion of the data.

To obtain a latency for each endpoint device, latency between each endpoint device may be continuously monitored and measured (e.g., prior to the data access event). For example, an endpoint device may send out test messages (e.g., pings) to each of the additional endpoint devices and a time to receive a response from the respective endpoint device may be measured. By doing so, based on an occurrence of a data access event, the endpoint device may select one endpoint device with the shortest latency to retrieve the copy of the portion of data requested and provide computer-implemented services using the copy of the portion of data.

To provide the above noted functionality, the system may include endpoint devices 100, and orchestrator 102. Each of these components is discussed below.

Endpoint devices 100 may include any number of endpoint devices (e.g., 100A-100N) that may be deployed to different physical locations and may be operably connected to each other and/or an orchestrator via a network (e.g., an edge network). Each of endpoint devices 100 may generate data relevant to experiences of the endpoint device (e.g., a data processing system) at the corresponding physical location.

Figure 2A:
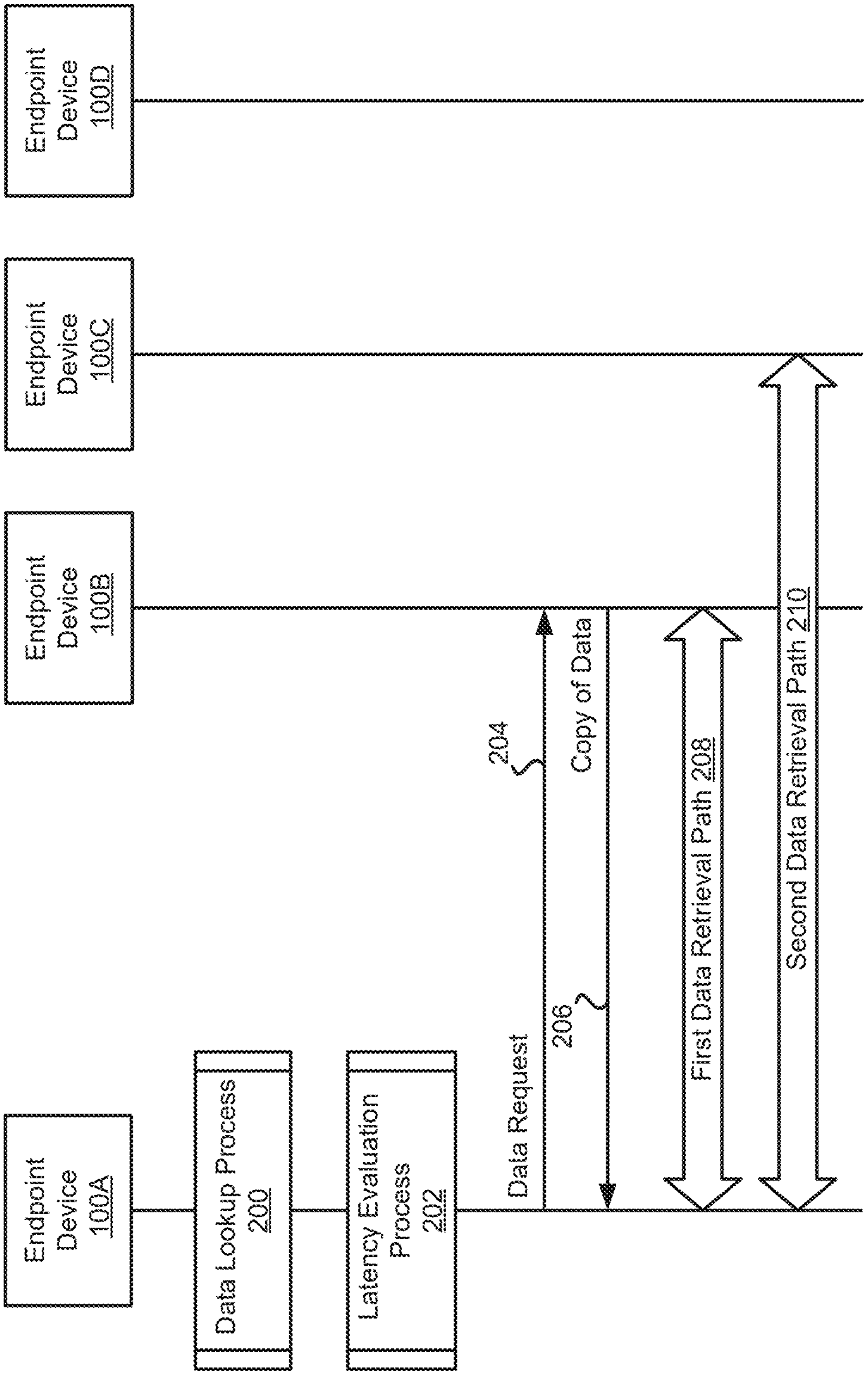
FIGS. 2A-2B show interaction diagrams in accordance with an embodiment.
Figure 2B:
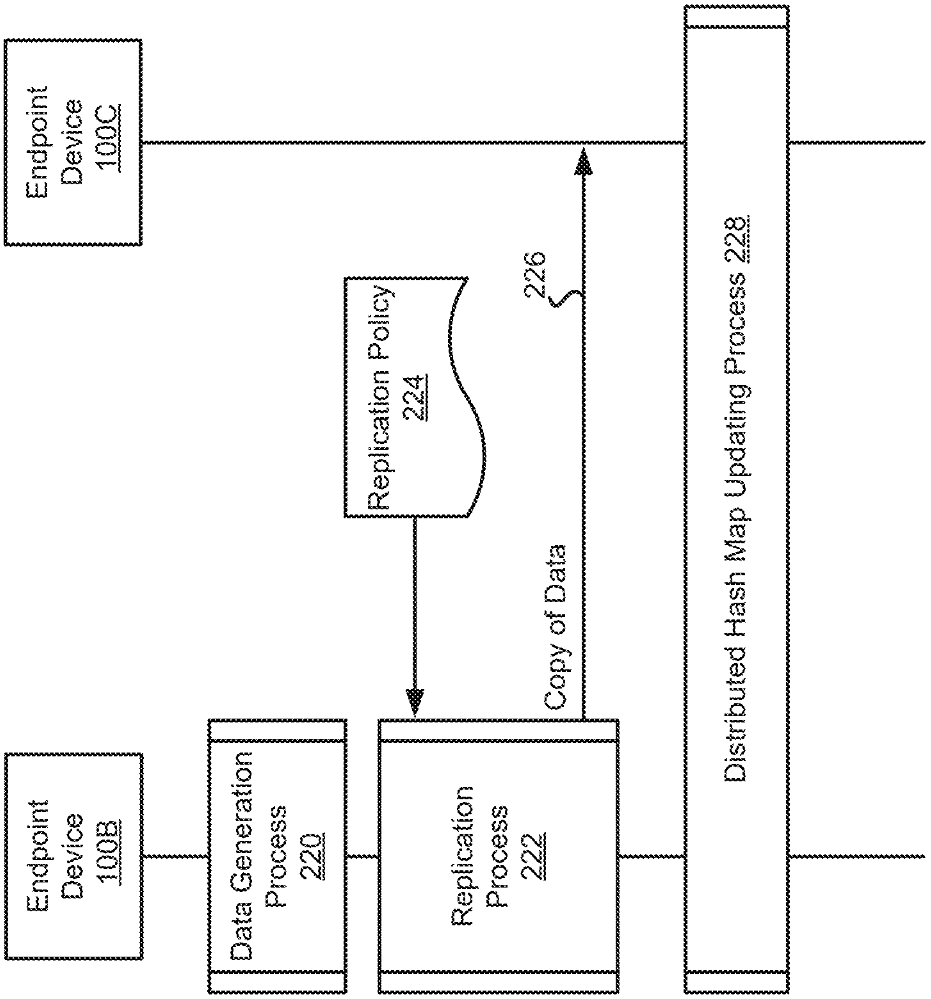

Endpoint devices 100 may, as discussed above, provide data synchronization services. To do so, endpoint devices 100 may (i) store copies of data (e.g., data generated by each endpoint device of endpoint devices 100), (ii) manage a distributed storage system (e.g., a distributed hash map) for use in storing and/or retrieving a portion of data hosted by endpoint devices 100, (iii) monitor latency between endpoint devices of endpoint devices 100, (iv) distribute the copies of the data based on criteria, and/or perform any other actions. Refer to FIGS. 2A-2B for additional information regarding data synchronization services provided by endpoint devices 100.

Figure 1B:
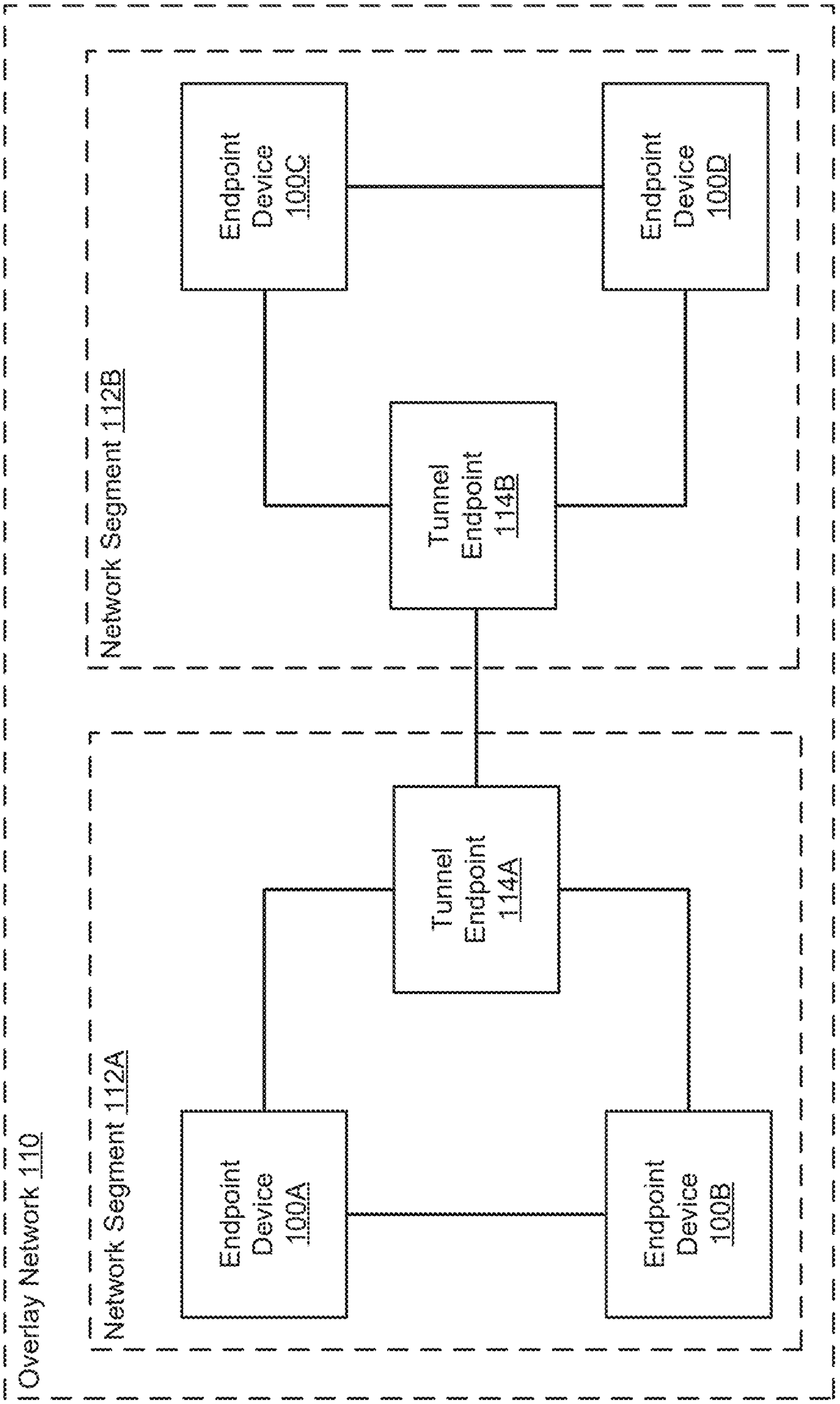
FIG. 1B shows a diagram illustrating an overlay network established by the system in accordance with an embodiment.

Orchestrator 102 may provide network management services. To provide the network management services, orchestrator 102 may establish an overlay network to manage network traffic between endpoint devices 100. For example, orchestrator 102 may (i) establish any number of network segments, (ii) assign any number of endpoint devices 100 to be members of the network segments, (iii) define a set of firewall rules (e.g., a whitelist for members of the overlay network) to be enforced by endpoint devices 100, and/or perform any other actions. Refer to FIG. 1B for additional details regarding the overlay network that may be established by orchestrator 102.

While providing their functionality, any of endpoint devices 100, and orchestrator 102 may provide all or a portion of the methods shown in FIGS. 2A-3B.

Communication system 104 may allow any of endpoint devices 100, and orchestrator 102 to communicate with one another (and/or with other devices not illustrated in FIG. 1A). To provide its functionality, communication system 104 may be implemented with one or more wired and/or wireless networks. Any of these networks may be a private network (e.g., the "Network" shown in FIG. 4), a public network, and/or may include the Internet. For example, endpoint devices 100 may be operably connected to orchestrator 102 via the Internet. Endpoint devices 100, and orchestrator 102 may be adapted to perform one or more protocols for communicating via communication system 104.

Any of (and/or components thereof) endpoint devices 100, and orchestrator 102 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

While illustrated in FIG. 1A with a limited number of specific components, a system may include additional, fewer, and/or different components without departing from embodiments disclosed herein.

Turning to FIG. 1B, a diagram of an overlay network in accordance with an embodiment is shown. Each endpoint device (e.g., 100A, 100B, etc.) shown in FIG. 1B may be similar to any of endpoint devices 100 shown in FIG. 1A.

As discussed above, overlay network 110 may be established by orchestrator 102 to manage network traffic between endpoint devices 100. For example, overlay network 110 may include: a virtual network, a virtual extensible local area network, a software-defined network, and/or any other logical network. Overlay network 110 may be configured with a set of firewall rules to enforce network communication between endpoint devices 100.

Furthermore, to improve control of network communication, overlay network 110 may be partitioned into any number of network segments (e.g., 112A, 112B). Each network segment of the network segments may be configured with a set of firewall rules for members of the respective segment. For example, as shown in FIG. 1B, endpoint device 100A and endpoint device 100B may be assigned by orchestrator 102 to be members of network segment 112A. Similarly, endpoint device 100C and endpoint device 100D may be assigned to be members of network segment 112B.

To facilitate communication between members of network segment 112A and members of network segment 112B, tunnel endpoints (e.g., a network router, virtual switch, etc.) may be deployed to each of the network segments. The tunnel endpoints (e.g., 114A, 114B) may provide traffic routing services for communication between network segment 112A and network segment 112B.

For example, consider a scenario in which a data access event may occur from endpoint device 100A for a portion of data hosted by endpoint devices 100. Based on a distributed hash map, endpoint device 100A may obtain a network address (e.g., a media control address (MAC), a virtual MAC, etc.) for endpoint device 100C. To provide a request for the portion of the data, endpoint device 100A may broadcast the request to communicate with the network address for endpoint device 100C. Tunnel endpoint 114A may (i) obtain the request, (ii) identify a route, (iii) encapsulate a network packet (e.g., including the network address, a payload, etc.), (iv) transmit the network packet to tunnel endpoint 114B, and/or perform any other actions. When obtained, the network packet may be (i) decapsulated by tunnel endpoint 114B, (ii) transmitted to endpoint device 100C, and/or subjected to any other process. Endpoint device 100C may respond to the request for the portion of the data following a reverse route (e.g., via encapsulation by tunnel endpoint 114B, transmission to tunnel endpoint 114A, etc.) to provide at least a copy of the portion of the data to endpoint device 100A. Endpoint device 100A may then provide computer-implemented services using the portion of the data.

Thus, as shown in FIG. 1B, an overlay network may be established to manage network communications between endpoint devices in an edge network. By doing so, data security may be improved when synchronizing data between the endpoint devices.

To further clarify embodiments disclosed herein, interaction diagrams in accordance with an embodiment are shown in FIGS. 2A-2B. The interaction diagram may illustrate how data may be obtained and used within the system of FIG. 1A.

In the interaction diagrams, processes performed by and interactions between components of a system in accordance with an embodiment are shown. In the diagram, components of the system are illustrated using a first set of shapes (e.g., 100A, 100B, etc.), located towards the top of each figure. Lines descend from these shapes. Processes performed by the components of the system are illustrated using a second set of shapes (e.g., 200, 202, etc.) superimposed over these lines. Interactions (e.g., communication, data transmissions, etc.) between the components of the system are illustrated using a third set of shapes (e.g., 204, 206, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the process labeled as 200 may occur prior to the interaction labeled as 204. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate processes and interactions that may occur during retrieval of a portion of data hosted by endpoint devices 100 based on an occurrence of a data access event.

Endpoint device 100A may be an endpoint device in a deployment of endpoint devices 100 operating in an edge environment. For example, endpoint device 100A may be a device (e.g., a data processing system) deployed to a physical location. Endpoint device 100A may provide at least a portion of computer-implemented services using a portion of data hosted by endpoint devices 100. To obtain the portion of the data, a data access event may occur from endpoint device 100A.

Endpoint device 100B may be a second endpoint device of endpoint devices 100. Endpoint device 100B may store a copy of the portion of the data according to a distributed hash map.

Endpoint device 100C may be a third endpoint device of endpoint devices 100 and may similarly store a copy of the portion of the data according to the distributed hash map (e.g., similar to endpoint device 100B).

Endpoint device 100D may be a fourth endpoint device of endpoint devices 100. Endpoint device 100D may store copies of a second portion of data (e.g., different than the portion of the data based on the data access event of endpoint device 100A).

Interactions and/or processes performed by endpoint device 100A, endpoint device 100B, endpoint device 100C, and endpoint device 100D in FIG. 2A may similarly be performed by other endpoint devices of endpoint devices 100.

To identify a portion of endpoint devices 100 that store copies of the portion of the data, data lookup process 200 may be performed. During data lookup process 200, a query may be issued for a portion of data, and a lookup may be performed on a distributed hash map. To issue the query, endpoint device 100A and/or a user of endpoint device 100A may provide a request and/or search for the portion of the data in the distrusted hash map. The query may include: (i) an identify of a data source (e.g., an endpoint device that generated the portion of the data), (ii) a metric for the portion of the data, (iii) a data and/or time that the portion of the data was generated, (iv) a range of dates and/or times, and/or any other information usable to identify the portion of the data.

To perform the lookup on the distributed hash map, a hashed representation of the query (e.g., a hash function applied to a string query) may be used as a key to obtain a lookup result. The lookup result may include information regarding identities of any number of endpoint devices of endpoint devices 100 that may store copies of the portion of data. For example, based on a query issued by endpoint device 100A, the lookup result may include network addresses (e.g., internet protocol addresses, media access control (MAC) addresses, virtual MAC addresses, etc.) of endpoint device 100B and endpoint device 100C.

To select one endpoint device from which to retrieve the portion of the data, latency evaluation process 202 may be performed. During latency evaluation process 202, latency metrics associated with each endpoint device may be compared. The latency metrics may be obtained by endpoint device 100A prior to and/or during latency evaluation process 202. For example, endpoint device 100A may obtain a latency metric for each endpoint device by monitoring a time required to send a message and receive a response from the respective endpoint device. Based on the lookup result of endpoint devices that may store the portion of the data (e.g., obtained from data lookup process 200) and criteria (e.g., a shortest latency), endpoint device may select one endpoint device from which to retrieve the portion of the data.

For example, as shown in FIG. 2A, endpoint device 100B and endpoint device 100C may both store a copy of the portion of the data as indicated by a lookup result. During latency evaluation process 202, endpoint device 100A may determine that a time to retrieve the copy of the portion of data from endpoint device 100B may be shorter than a time to retrieve the copy of the portion of the data from endpoint device 100C. Therefore, endpoint device 100B may be selected to retrieve the copy of the portion of the data. While shown as being a separate process in FIG. 2A, it may be appreciated that latency evaluation process 202 may occur concurrently with data lookup process 200.

At interaction 204, a data request may be provided to endpoint device 100B by endpoint device 100A. The data request may be generated and provided to endpoint device 100B via (i) transmission via a message, (ii) an application interface programming interface (API) call, (iii) a publish-subscribe system where endpoint device 100B subscribes to updates from endpoint device 100A thereby causing a copy of the data request to be propagated to endpoint device 100B, and/or any other processes. The data request may be provided using first data retrieval path 208, discussed below. By providing the data request to endpoint device 100B, endpoint device 100B may respond with the copy of the portion of data based on the data request.

At interaction 206, a copy of the portion of the data may be provided to endpoint device 100A by endpoint device 100B. The copy of the portion of the data may be generated and provided to endpoint device 100A via (i) transmission via a message, (ii) an API call, (iii) a publish-subscribe system where endpoint device 100A subscribes to updates from endpoint device 100B thereby causing the copy the portion of the data to be propagated to endpoint device 100A, and/or any other processes. The transmission of the copy of the data may similarly utilize first data retrieval path 208. By providing the copy of the portion of the data to endpoint device 100A, endpoint device 100A may provide computer-implemented services using the portion of the data.

First data retrieval path 208 is shown to indicate the communication channel with which endpoint device 100A may utilize to retrieve the copy of the portion of the data from endpoint device 100B. For example, consider a scenario in which endpoint device 100A and endpoint device 100B are members of a network segment of an overlay network. Firewall rules configured for the overlay network may allow members of the network segment to send messages to each other. To do so, network packets (e.g., user datagram protocol packets) including messages may be transmitted between the members. Therefore, using first data retrieval path 208, endpoint device 100A may send the data request (e.g., at interaction 204) and receive the response including the copy of the portion of the data (e.g., at interaction 206) from endpoint device 100B.

Second data retrieval path 210 is shown to indicate that the copy of the portion of the data based on the query issued by endpoint device 100A may also be retrieved from endpoint device 100C. However, because it may be determined (e.g., during latency evaluation process 202) that a time to retrieve the data using second data retrieval path 210 may be longer than a time required using first data retrieval path 208. A longer time required (e.g., latency) to obtain the portion of the data may negatively impact computer-implemented services provided by endpoint device 100A. Therefore, second data retrieval path 210 may not be utilized by endpoint device 100A.

Thus, via processes and interactions shown in FIG. 2A, data may be retrieved by a first endpoint device and a second endpoint device selected based on criteria (e.g., availability of the data, latency, etc.). By doing so, a quality and/or a timeliness of computer-implemented services provided by the first endpoint device based on the data may be improved.

Turning to FIG. 2B, a second interaction diagram in accordance with an embodiment is shown. The second interaction diagram may illustrate processes and interactions that may occur during distribution of data between endpoint devices in an edge network.

To obtain data from a data source, data generation process 220 may be performed. During data generation process 220, endpoint device 100B may collect data relevant to experiences by endpoint device 100B. For example, consider a scenario in which endpoint device 100B is deployed to collect temperature measurements at a certain location of an agricultural farm. To collect the data, endpoint device 100B may: (i) monitor a state of a data source over any period of time, (ii) measure a data metric (e.g., using a sensor), (iii) store a local copy of the data, and/or perform any other actions.

To identify additional endpoint devices to store copies of the data generated by endpoint device 100B, replication process 222 may be performed. During replication process 222, a replication policy may be implemented, and copies of the data may be stored in additional endpoint devices. Replication policy 224 may include any number and type of information regarding a set of rules for storing the copies of the data. For example, the set of rules defined by replication policy 224 may indicate: (i) fault domain requirements for replicated copies of stored data, (ii) latency requirements for accessing the replicated copies of stored data, and/or any other criteria.

To implement replication policy 224, endpoint device 100B may (i) obtain information regarding the additional endpoint devices (e.g., in the overlay network that may be available to host copies of the data), (ii) apply the set of rules defined by replication policy 224 (e.g., to identify candidates, filter out endpoint devices from an auxiliary lookup table, etc.), and/or perform any other actions.

At interaction 226, a copy of the data may be provided to endpoint device 100C by endpoint device 100B. The copy of the data may be generated and provided to endpoint device 100C by (i) transmitting network packets (e.g., including a network address, a payload, etc.) to endpoint device 100C, (ii) storing in a local storage and providing instructions for subsequent retrieval by endpoint device 100C, and/or performing any other processes. By providing the copy of the data to endpoint device 100C, endpoint device 100C may store a copy of the data so that endpoint device 100C may provide the copy of the data based on a data access event.

To inform other endpoint devices of replicated copies of the data, distributed hash map updating process 228 may be performed. During distributed hash map updating process 228, a key may be assigned for a portion of the data in a distributed hash map, and information regarding the copies of the portion of the data may be added to the distributed hash map. To assign a key for the portion of the data, a hash function may be applied to a string value of information related to the portion of the data (e.g., a combination of an endpoint device identifier, data metric, date, time, etc.). To add the information regarding the copies of the portion of the data, endpoint device 100B may, for example, add an entry to the distributed hash table using the key (e.g., via an API call, an issued command, etc.). The entry may include, for example, (i) a data metric, (ii) a data source, (iii) identities of endpoint devices that may store replicated copies of the portion of the data, and/or any other information.

Thus, via processes and interactions shown in FIG. 2B, data generated by an endpoint device may be replicated based on a replication policy and copies of the data may be stored based on a distributed hash map. By doing so, any number of endpoint devices may store a portion of data so that the portion of the data may be accessed in a reliable and/or timely manner.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
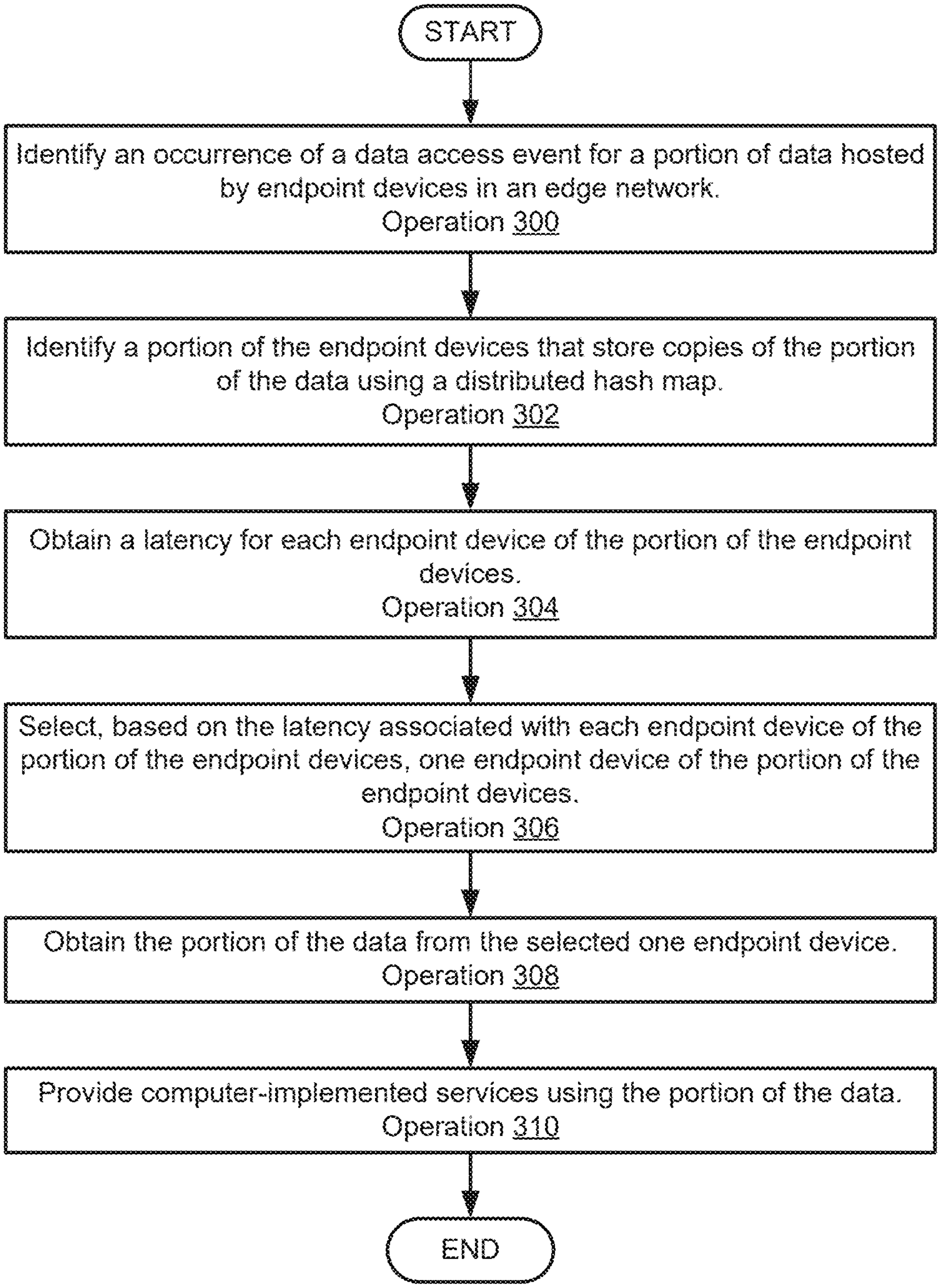
FIGS. 3A-3B show flow diagrams illustrating methods in accordance with an embodiment.
Figure 3B:
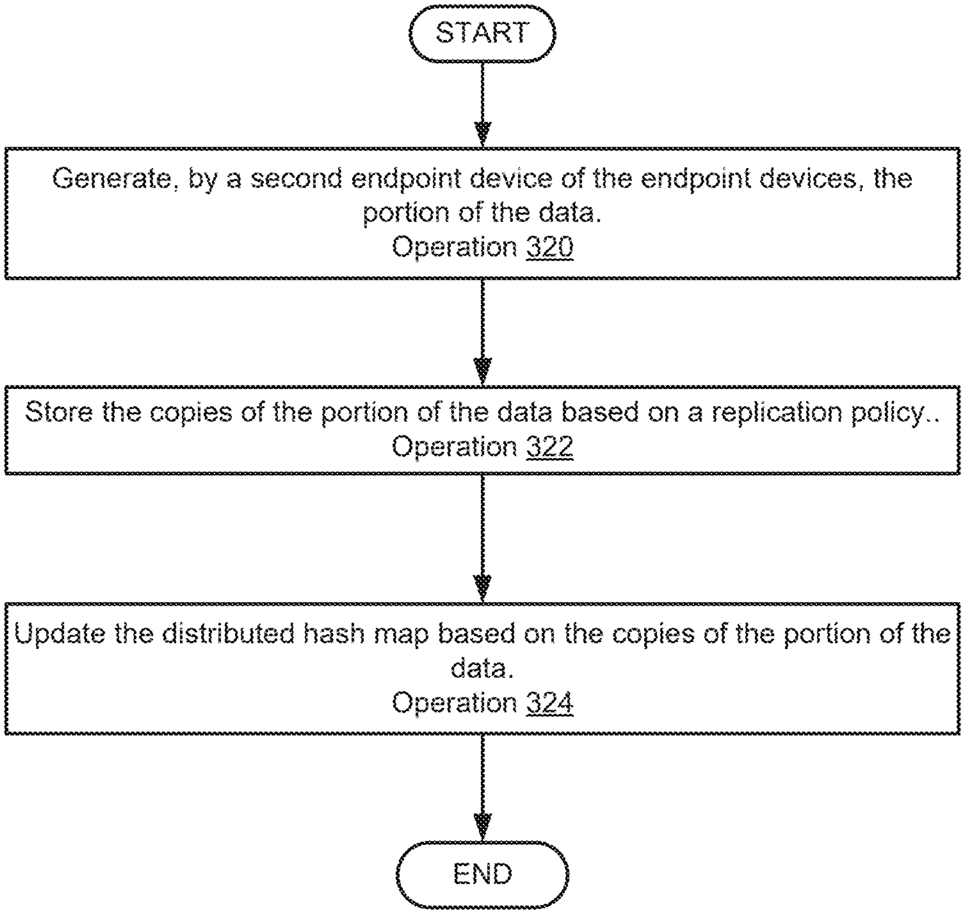

As discussed above, the components of FIG. 1A may perform various methods to manage data synchronization between endpoint devices in an edge environment. FIGS. 3A-3B illustrates methods that may be performed by the components of the system of FIG. 1A. In the diagrams discussed below and shown in FIGS. 3A-3B, any of the operations may be repeated, performed in different orders, and/or performed in parallel with or in a partially overlapping in time manner with other operations.

Turning to FIG. 3A, a first flow diagram illustrating a method of managing synchronization between endpoint devices in an edge network in accordance with an embodiment is shown. The method may be performed, for example, by any of the components of the system of FIG. 1A, and/or other components not shown therein.

Prior to operation 300, copies of a portion of data hosted by endpoint devices may be distributed and stored based on a distributed hash map. The copies of the portion of the data may be distributed by: (i) generating the portion of the data, (ii) storing copies of the portion of the data, (iii) updating a distributed hash map based on the copies of the portion of the data, and/or any other processes. Refer to FIG. 3B for additional details.

At operation 300, an occurrence of a data access event for a portion of data hosted by the endpoint devices may be identified. The occurrence may be identified by: (i) receiving a message indicating a request for a portion of the data, (ii) obtaining a query including search terms relevant to the portion of the data requested, and/or any other process.

At operation 302, a portion of the endpoint devices that store copies of the portion of the data may be identified. The portion of the endpoint devices may be identified by: (i) obtaining a key based on a hashed representation of the query (e.g., obtained at operation 300), (ii) performing a lookup in a distributed hash table hosted by the endpoint device using the key, (iii) obtaining a lookup result that indicates identities of the portion of the endpoint devices that may store copies of the portion of the data, and/or any other process.

At operation 304, a latency for each endpoint device of the portion of the endpoint devices may be obtained. The latency for each endpoint device may be obtained by: (i) monitoring latency times for communication with each endpoint device during a prior period of time, (ii) maintaining a data storage of the latency times, (iii) sending test messages to each endpoint device, and/or any other process.

At operation 306, one endpoint device of the portion of the endpoint devices may be selected. The one endpoint device may be selected by (i) comparing the latencies of each of the portion of the endpoint devices, (ii) identifying the one endpoint device with a latency that meets criteria (e.g., shortest latency), and/or any other process.

At operation 308, the portion of the data may be obtained from the selected one endpoint device. the portion of the data may be obtained by: (i) broadcasting a request for the portion of the data to the selected one endpoint device, (ii) obtaining, by an entity configured to route network traffic (e.g., a tunnel endpoint of the overlay network), (iii) providing the request to the selected one endpoint device, (iv) responding, by the selected one endpoint device, with a copy of the portion of the data, (v) receiving a message including the copy of the portion of the data, and/or any other process.

At operation 310, computer-implemented services may be performed using the portion of the data. The computer-implemented services may be performed by (i) processing the portion of the data, (ii) performing an action set based on the portion of the data, and/or any other actions.

The method may end following operation 310.

Using the method shown in FIG. 3A, data hosted by endpoint devices in an edge network may be shared between endpoint devices while considering latency between the endpoint devices. By doing so, a quality and/or timeliness of computer-implemented services provided by endpoint devices using the data may be improved.

Turning to FIG. 3B, a second flow diagram illustrating a method of distributing copies of data between endpoint devices in accordance with an embodiment is shown. The method may be performed, for example, by any of the components of the system of FIG. 1A, and/or other components not shown therein.

At operation 320, the portion of the data may be generated by a second endpoint device of the endpoint devices. The portion of the data may be generated by: (i) monitoring a state of a data source over any period of time, (ii) measuring a data metric (e.g., using a sensor), (iii) storing a local copy of the data, and/or performing any other actions.

At operation 322, copies of the portion of the data may be stored based on a replication policy. The copies of the portion of the data may be stored by (i) identifying additional endpoint devices that meet the replication policy (e.g., hosted in different fault domains, meet latency requirements, etc.), (ii) transmitting messages (e.g., including a network address, a payload of the copy of the portion of the data, etc.) to each of the additional endpoint devices, (ii) storing the copy of the portion of the data in a local storage and providing instructions for subsequent retrieval to the additional endpoint devices, and/or any other process.

At operation 324, the distributed hash map may be updated based on the copies of the portion of the data. The distributed hash map may be updated by: (i) generating a key based, at least in part, on a hash function, (ii) assigning the key for the portion of the data in the distributed hash table, (iii) storing, using the key, information regarding the copies of the portion of the data in the distributed hash map, and/or any other process.

The method may end following operation 324.

Using the method shown in FIG. 3B, data generated by an endpoint device may be replicated based on a replication policy so that copies of the data may be stored on any number of additional endpoint devices. By doing so, a likelihood that latency criteria may be met while accessing a copy of the copies of the data based on a future occurrence of a data access event may be improved.

Figure 4:
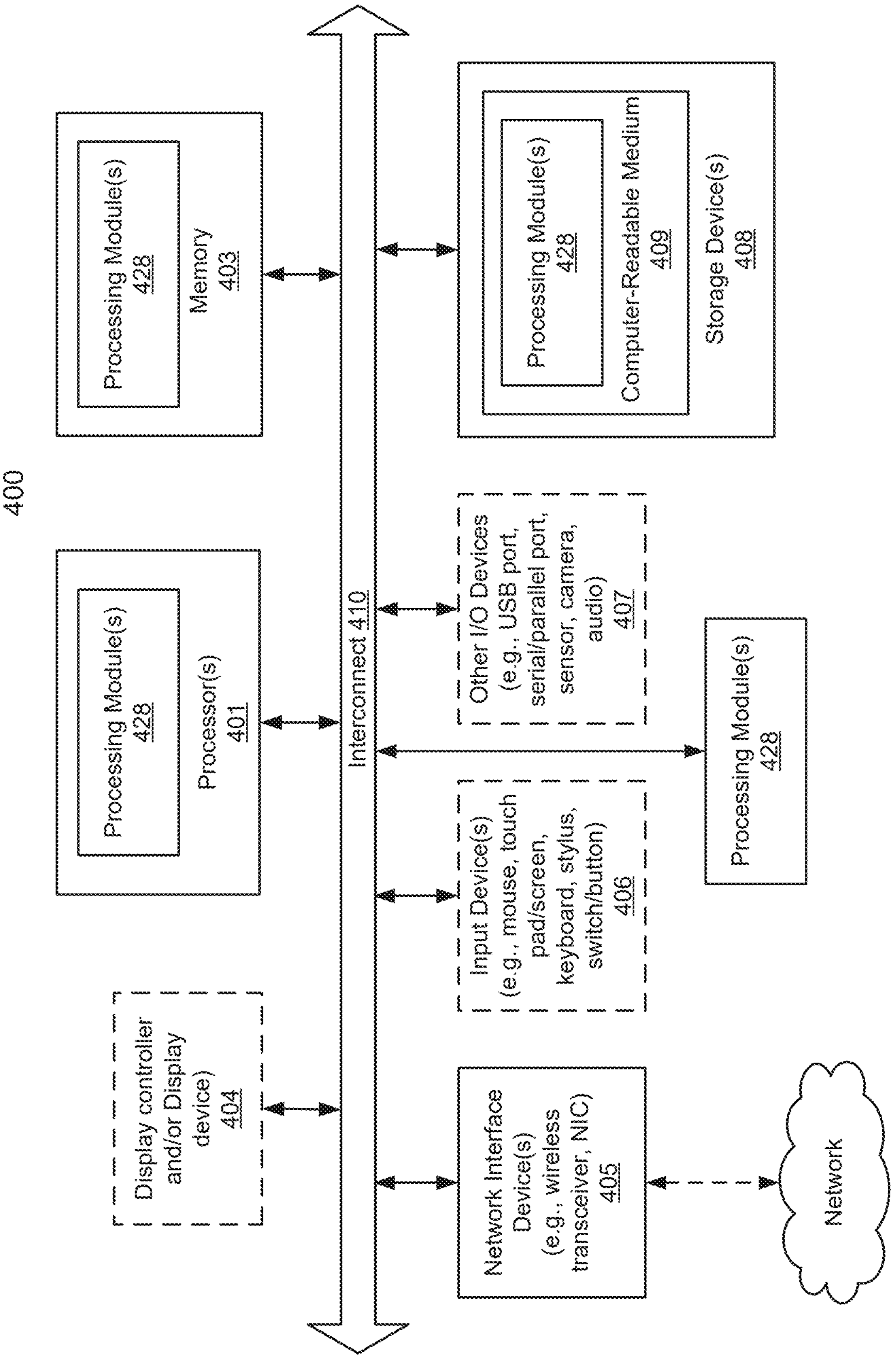
FIG. 4 shows a block diagram illustrating a data processing system in accordance with an embodiment.

Any of the components illustrated in FIGS. 1A-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both.

Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing data synchronization between endpoint devices in an edge network, the method comprising:

generating, by a source endpoint device of the endpoint devices, a portion of data;

storing, by the source endpoint device and based on a replication policy, copies of the portion of the data at a portion of the endpoint devices, wherein the replication policy defines a set of rules for storing the copies of the portion of the data, the set of rules for storing the copies of the portion of the data indicates:

fault domain requirements to utilize different power sources among the endpoint devices for replicated copies of stored data; and latency requirements for accessing the replicated copies of stored data so that an average latency for accessing a copy of the copies of the portion of the data meets a time threshold;

updating a distributed hash map based on the copies of the portion of the data;

identifying an occurrence of a data access event for the portion of the data hosted by the endpoint devices;

based on the occurrence:

identifying the portion of the endpoint devices that store the copies of the portion of the data using the distributed hash map;

obtaining a latency for each endpoint device of the portion of the endpoint devices, the latency indicating a time required for the portion of the data to be retrieved from the respective endpoint device, wherein the identifying of the portion of the endpoint devices that store the copies of the portion of the data occurs concurrently with evaluation of the latency for each of the portion of endpoint devices;

selecting, based on the latency associated with each endpoint device of the portion of the endpoint devices, one endpoint device of the portion of the endpoint devices;

obtaining the portion of the data from the selected one endpoint device; and providing computer-implemented services using the portion of the data.

2. The method of claim 1, wherein updating the distributed hash map comprises:

assigning a key for the portion of the data, the key being based, at least in part, on a hash function; and storing, using the key, information regarding the copies of the portion of the data in the distributed hash map.

3. The method of claim 1, wherein the endpoint devices are members of an overlay network, the overlay network being managed using a set of firewall rules enforced by the endpoint devices.

4. The method of claim 3, wherein obtaining the portion of the data from the selected one endpoint device comprises communicating with the selected one endpoint device while adhering to the set of firewall rules, the firewall rules comprising a first rule set for non-overlay network communications, and a second rule set for overlay network communication, the second rule set comprising a whitelist for members of the overlay network.

5. The method of claim 1, wherein identifying the portion of the endpoint devices that store copies of the portion of the data using the distributed hash map comprises:

performing a lookup in the distributed hash map using a hashed representation of a query as a key to obtain a lookup result that indicates identities of the portion of endpoint devices that stores the copies of the portion of the data.

6. The method of claim 5, wherein the query comprises:

an identity of an endpoint device that generated the portion of the data;

a metric of the portion of the data; and a date and/or time that the portion of the data was generated.

7. The method of claim 3, wherein the overlay network comprises network segments, each network segment comprising a tunnel endpoint that manages communication with other network segments.

8. The method of claim 7, wherein in a first instance of a requesting endpoint device that originates the data access event and the selected one endpoint device being in a same network segment, a publish-subscribe system where the requesting endpoint device subscribes to updates from the selected one endpoint device causes the copy of the portion of the data of the selected one endpoint device to be propagated to the requesting endpoint device.

9. The method of claim 8, wherein in a second instance of the requesting endpoint device and the selected one endpoint device being in different network segments, the copy of the portion of the data of the selected one endpoint device is propagated a first tunnel endpoint of the selected one endpoint device to a second tunnel endpoint of the requesting endpoint device, the first tunnel endpoint and the second tunnel endpoint enforcing a first rule set to maintain data security between the different network segments.

10. The method of claim 9, wherein the first rule set comprises encapsulating a network packet, the network packet comprising a network address of the selected one endpoint device and a payload.

11. The method of claim 10, wherein the network address is a virtual media control address of the overlay network obtained in using the distributed hash map to identify the portion of the endpoint devices that store the copies of the portion of the data.

12. The method of claim 11, wherein the virtual media control address and first rule set are established by an orchestrator of the edge network.

13. A non-transitory machine-readable medium having instructions stored therein, which when executed by a processor, cause the processor to perform operations for managing data synchronization between endpoint devices in an edge network, the operations comprising:

generating, by a source endpoint device of the endpoint devices, a portion of data;

storing, by the source endpoint device and based on a replication policy, copies of the portion of the data at a portion of the endpoint devices, wherein the replication policy defines a set of rules for storing the copies of the portion of the data, the set of rules for storing the copies of the portion of the data indicates:

fault domain requirements to utilize different power sources among the endpoint devices for replicated copies of stored data; and latency requirements for accessing the replicated copies of stored data so that an average latency for accessing a copy of the copies of the portion of the data meets a time threshold;

updating a distributed hash map based on the copies of the portion of the data;

identifying an occurrence of a data access event for the portion of the data hosted by the endpoint devices;

based on the occurrence:

identifying the portion of the endpoint devices that store the copies of the portion of the data using the distributed hash map;

obtaining a latency for each endpoint device of the portion of the endpoint devices, the latency indicating a time required for the portion of the data to be retrieved from the respective endpoint device, wherein the identifying of the portion of the endpoint devices that store the copies of the portion of the data occurs concurrently with evaluation of the latency for each of the portion of endpoint devices;

selecting, based on the latency associated with each endpoint device of the portion of the endpoint devices, one endpoint device of the portion of the endpoint devices;

obtaining the portion of the data from the selected one endpoint device; and providing computer-implemented services using the portion of the data.

14. The non-transitory machine-readable medium of claim 13, wherein updating the distributed hash map comprises:

assigning a key for the portion of the data, the key being based, at least in part, on a hash function; and storing, using the key, information regarding the copies of the portion of the data in the distributed hash map.

15. The non-transitory machine-readable medium of claim 13, wherein the endpoint devices are members of an overlay network, the overlay network being managed using a set of firewall rules enforced by the endpoint devices.

16. The non-transitory machine-readable medium of claim 15, wherein obtaining the portion of the data from the selected one endpoint device comprises communicating with the selected one endpoint device while adhering to the set of firewall rules, the firewall rules comprising a first rule set for non-overlay network communications, and a second rule set for overlay network communication, the second rule set comprising a whitelist for members of the overlay network.

17. A data processing system, comprising:

a processor;

and a memory coupled to the processor to store instructions, which when executed by the processor, cause the processor to perform operations for managing data synchronization between endpoint devices in an edge network, the operations comprising:

generating, by a source endpoint device of the endpoint devices, a portion of data;

storing, by the source endpoint device and based on a replication policy, copies of the portion of the data at a portion of the endpoint devices, wherein the replication policy defines a set of rules for storing the copies of the portion of the data, the set of rules for storing the copies of the portion of the data indicates:

fault domain requirements to utilize different power sources among the endpoint devices for replicated copies of stored data; and latency requirements for accessing the replicated copies of stored data so that an average latency for accessing a copy of the copies of the portion of the data meets a time threshold;

updating a distributed hash map based on the copies of the portion of the data;

identifying an occurrence of a data access event for the portion of the data hosted by the endpoint devices;

based on the occurrence:

identifying the portion of the endpoint devices that store the copies of the portion of the data using the distributed hash map;

obtaining a latency for each endpoint device of the portion of the endpoint devices, the latency indicating a time required for the portion of the data to be retrieved from the respective endpoint device, wherein the identifying of the portion of the endpoint devices that store the copies of the portion of the data occurs concurrently with evaluation of the latency for each of the portion of endpoint devices;

selecting, based on the latency associated with each endpoint device of the portion of the endpoint devices, one endpoint device of the portion of the endpoint devices;

obtaining the portion of the data from the selected one endpoint device; and providing computer-implemented services using the portion of the data.

18. The data processing system of claim 17, wherein updating the distributed hash map comprises:

assigning a key for the portion of the data, the key being based, at least in part, on a hash function; and storing, using the key, information regarding the copies of the portion of the data in the distributed hash map.

19. The data processing system of claim 17, wherein the endpoint devices are members of an overlay network, the overlay network being managed using a set of firewall rules enforced by the endpoint devices.

20. The data processing system of claim 19, wherein obtaining the portion of the data from the selected one endpoint device comprises communicating with the selected one endpoint device while adhering to the set of firewall rules, the firewall rules comprising a first rule set for non-overlay network communications, and a second rule set for overlay network communication, the second rule set comprising a whitelist for members of the overlay network.

* * * * *